(12) United States Patent
Yasufuku

(10) Patent No.: US 8,131,977 B2
(45) Date of Patent: Mar. 6, 2012

(54) MICROPROCESSOR INHIBITING INSTRUCTION STORAGE IN CACHE AND NOT DECODING BASED ON PRE-ANALYSIS INFORMATION TO REDUCE POWER CONSUMPTION

(75) Inventor: Kenta Yasufuku, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 435 days.

(21) Appl. No.: 12/200,257

(22) Filed: Aug. 28, 2008

(65) Prior Publication Data

US 2009/0063822 A1 Mar. 5, 2009

(30) Foreign Application Priority Data

Aug. 31, 2007 (JP) ................................ 2007-226999

(51) Int. Cl.
*G06F 9/30* (2006.01)
(52) U.S. Cl. ................... 712/208; 712/E9.028; 713/324
(58) Field of Classification Search .......................... None
See application file for complete search history.

(56) References Cited

U.S. PATENT DOCUMENTS

| 4,437,149 | A | * | 3/1984 | Pomerene et al. | ............ 712/213 |
| 6,859,870 | B1 | | 2/2005 | Kim et al. | |
| 6,877,087 | B1 | | 4/2005 | Yamada et al. | |
| 2005/0071701 | A1 | * | 3/2005 | Luick | ............................ 713/320 |
| 2007/0288724 | A1 | * | 12/2007 | Goko et al. | ................... 712/219 |

FOREIGN PATENT DOCUMENTS

| JP | 4-239919 | 8/1992 |
| JP | 9-16471 | 1/1997 |
| JP | 11-119997 | 4/1999 |
| JP | 2003-167732 | 6/2003 |
| JP | 2004-62280 | 2/2004 |
| JP | 2009-516254 | 4/2009 |
| WO | WO 2007/057828 A2 | 5/2007 |

OTHER PUBLICATIONS

Japanese Office Action issued Nov. 9, 2010, in Patent Application No. 2007-226999 (with English-language translation).
U.S. Appl. No. 12/882,588, filed Sep. 15, 2010, Yasufuku, et al.

* cited by examiner

*Primary Examiner* — Kenneth Kim
(74) *Attorney, Agent, or Firm* — Oblon, Spivak, McClelland, Maier & Neustadt, L.L.P.

(57) ABSTRACT

A microprocessor includes: a processor core that performs pipeline processing; an instruction analyzing section that analyzes an instruction to be processed by the processor core and outputs analysis information indicating whether the instruction matches with a specific instruction; and a memory that temporary stores the instruction with the analysis information, wherein the processor core includes: an instruction fetch unit that fetches the instruction stored in the memory; an instruction decode unit that decodes the instruction fetched by the instruction fetch unit; an instruction execute unit that executes the instruction decoded by the instruction decode unit; and a specific instruction execute controller that reads out the analysis information stored in the memory and controls operation of at least one of the instruction fetch unit and the instruction decode unit when the analysis instruction indicates that the instruction matches with the specific instruction.

3 Claims, 7 Drawing Sheets

MICROPROCESSOR INHIBITING INSTRUCTION STORAGE IN CACHE AND NOT DECODING BASED ON PRE-ANALYSIS INFORMATION TO REDUCE POWER CONSUMPTION

RELATED APPLICATION(S)

The present disclosure relates to the subject matter contained in Japanese Patent Application No. 2007-226999 filed on Aug. 31, 2007, which is incorporated herein by reference in its entirety.

FIELD

The present invention relates to a microprocessor.

BACKGROUND

There is known a technique for increasing processing speed of a microprocessor, which is called a pipeline processing. In the pipeline processing, instructions to be processed by a processor core is divided into stages, such as instruction fetch, instruction decode, and instruction execute, and the processes in the respective stages are performed in parallel.

In order to efficiently perform the pipeline processing, it is necessary that the processing times in the respective stages should be equal. For this purpose, an instruction cache, in which time required for memory access is short, is disposed, so as to increase the speed of the instruction fetch. An example of such technique is disclosed in JP-A-2003-162446.

In the conventional microprocessor, it is unable to determine the type of the instruction, unless the instruction is decoded. Accordingly, even when the instruction is an instruction for which no processing is required, such as a NOP (No OPeration) instruction, the operation of the instruction fetch and the instruction decode are inevitably performed. As a result, electric power is wastefully consumed in the stages of the instruction fetch and the instruction decode for the NOP instruction.

Such wasteful power consumption due to execution of a NOP instruction is sometimes noticeably increased particularly in a microprocessor of a VLIW (Very Long Instruction Word) type because of the following reason. In a microprocessor of the VLIW type, plural instructions are collected into one instruction, and executed as single instruction. In a case where the number of instructions to be simultaneously executed does not reach a specified number, the deficiency is therefore filled with NOP instructions. Accordingly the appearance frequency of NOP instructions is considerably high in the microprocessor of the VLIW type.

In a case where the instruction to be processed is an unconditional branch instruction, the next instruction that is read from the instruction cache will be invalid. However, in the pipeline processing, while the unconditional branch instruction is being decoded, the instruction fetch for the next instruction is already been started. Accordingly, also in this case, electric power is wastefully consumed for the operation in the instruction fetch stage and the access to the instruction cache.

As described above, in a conventional microprocessor, there is a problem in that the electric power is wastefully consumed depending on the type of an instruction.

SUMMARY

According to one aspect of the invention, there is provided a microprocessor including: a processor core that performs pipeline processing; an instruction analyzing section that analyzes an instruction to be processed by the processor core and outputs analysis information indicating whether the instruction matches with a specific instruction that is previously defined; and a memory that temporary stores the instruction with the analysis information, wherein the processor core includes: an instruction fetch unit that fetches the instruction stored in the memory; an instruction decode unit that decodes the instruction fetched by the instruction fetch unit; an instruction execute unit that executes the instruction decoded by the instruction decode unit; and a specific instruction execute controller that reads out the analysis information stored in the memory and controls operation of at least one of the instruction fetch unit and the instruction decode unit when the analysis instruction indicates that the instruction matches with the specific instruction.

DETAILED DESCRIPTION OF THE EMBODIMENT(S)

Figure 1:
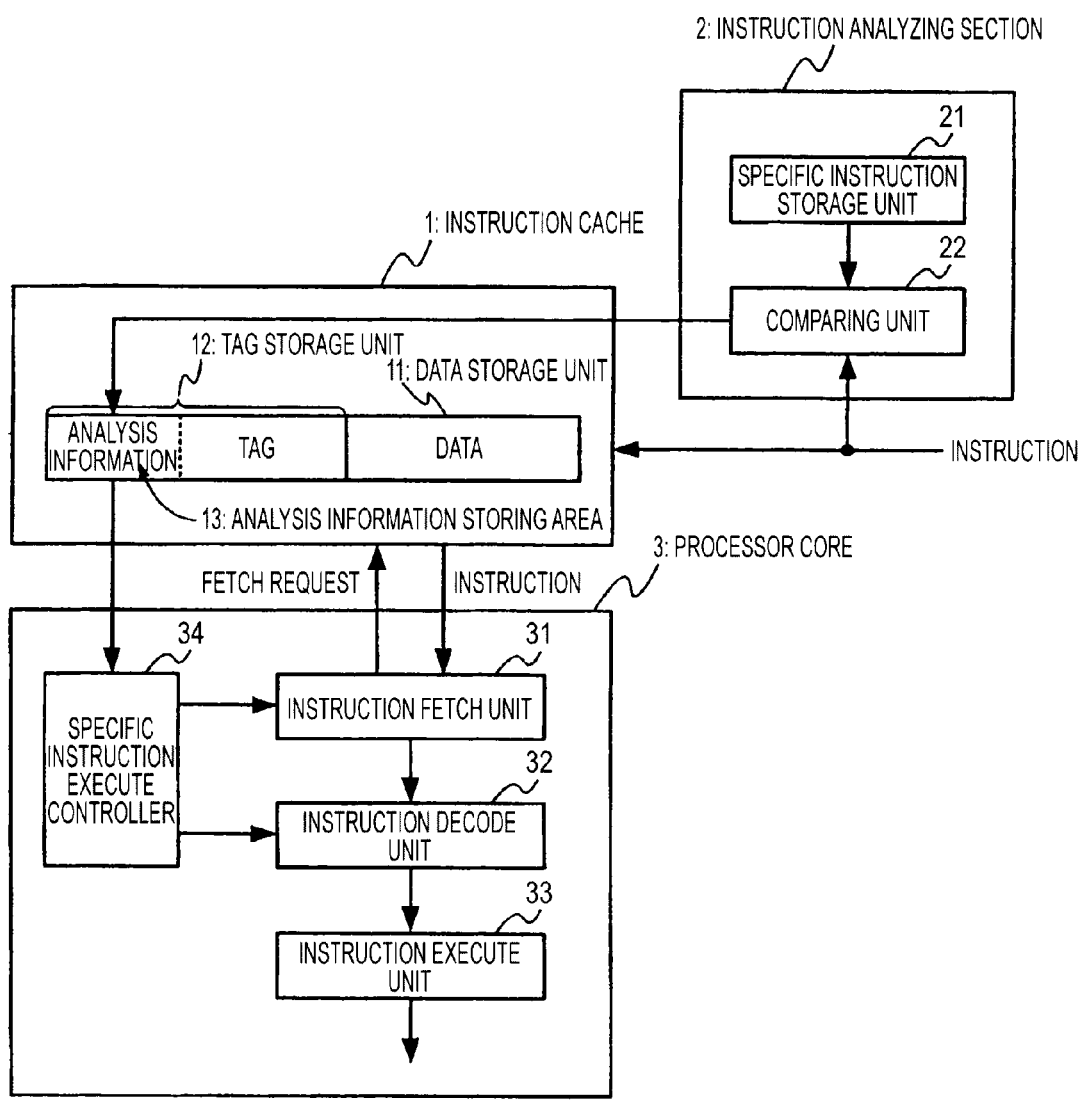
FIG. 1 is a block diagram showing a general example of a microprocessor according to the present invention.

Hereinafter, embodiments of the present invention will be described with reference to the accompanying drawings. The drawings are schematically represented, and it should be noted that the dimensions, ratios, and the like of the drawings are different from those of actual products. In addition, a part having different relationship of dimensions and/or a different ratio is included in the drawings. In particular, embodiments described below are for exemplifying a device and a method that are used for embodying the technical concept of the present invention. The technical concept of the present invention should not be determined to be limited based on the shape, structure, arrangement, and the like of components shown in the drawings. In the technical concept of the present invention, various changes can be made without departing from the scope of the claimed invention.

FIG. 1 is a block diagram showing a general example of a microprocessor according to the present invention.

The microprocessor is provided with: an instruction cache 1 that includes a data storage unit 11 and a tag storage unit 12; an instruction analyzing section 2 that analyzes an instruction input into the instruction cache 1 and outputs analysis information indicating whether the instruction is a specific instruction that is previously defined; and a processor core 3 that includes an instruction fetch unit 31, an instruction decode unit 32, and an instruction execute unit 33, which perform a pipeline processing of an instruction fetched from the instruction cache 1, and a specific instruction execute controller 34 that controls the execution of the specific instruction.

The instruction analyzing section 2 has a specific instruction storage unit 21 that stores a specific instruction that is previously defined, and a comparing unit 22 that compares an instruction input into the instruction cache 1 with the specific instruction stored in the specific instruction storage unit 21 and outputs a result of the comparison as analysis information.

When the instruction input into the instruction cache 1 matches with the specific instruction stored in the specific instruction storage unit 21, the comparing unit 22 of the instruction analyzing section 2 outputs "1". Te comparing unit 22 outputs "0" when the instruction input into the instruction cache 1 does not match with the specific instruction stored in the specific instruction storage unit 21

The instruction cache 1 has an analysis information storing area 13 in the tag storage unit 12. In the analysis information storing area 13, the analysis information output from the instruction analyzing section 2 is stored in a paired manner with tag data of the instruction stored in the tag storage unit 12.

When the instruction fetch unit 31 outputs a fetch request and fetches an instruction from the instruction cache 1, the specific instruction execute controller 34 of the processor core 3 reads out the analysis information related to the instruction from the analysis information storing area 13. When the analysis information indicates that the instruction is the above-mentioned specific instruction, the specific instruction execute controller controls the operations of the instruction fetch unit 31 and the instruction decode unit 32.

Hereinafter, embodiments of the invention will be described with reference to the accompanying drawings by way of an example of a VLIW-type microprocessor in which four instructions are processed in parallel in a pipeline.

First Embodiment

Figure 2:
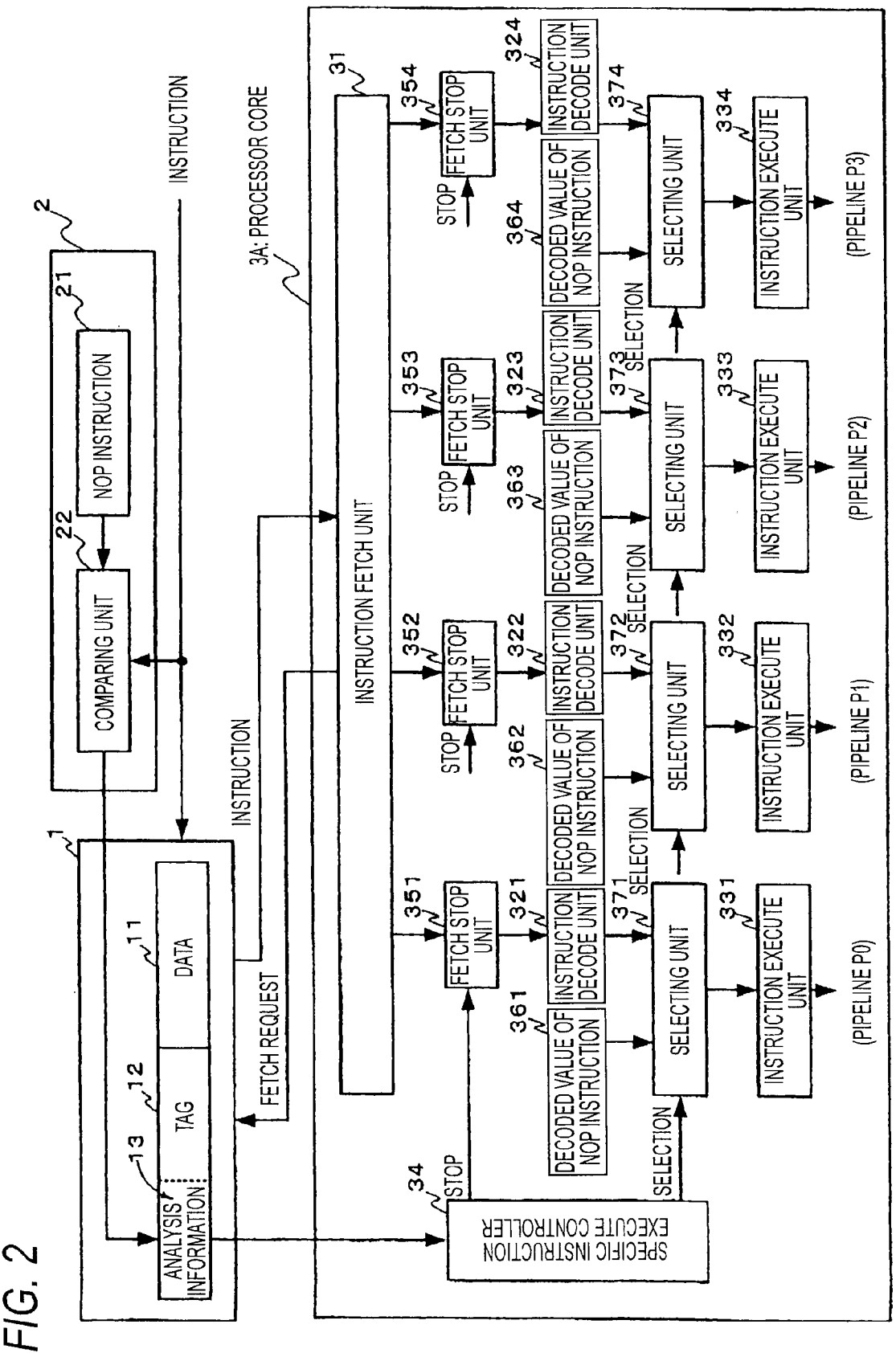
FIG. 2 is a block diagram showing an example of a configuration of a microprocessor according to a first embodiment of the present invention.

FIG. 2 is a block diagram showing an example of the configuration of a microprocessor according to a first embodiment of the present invention.

The microprocessor according to the first embodiment is a VLIW-type microprocessor with a fixed instruction length. A processor core 3A is provided with four pipelines P0, P1, P2, P3. Each instruction in one pipeline has a 32-bit length, and the instruction for one cycle has a 128-bit length.

The processor core 3A includes an instruction fetch unit 31, and, for the respective pipelines P0, P1, P2, P3, instruction decode units 321, 322, 323, 324, and instruction execute units 331, 332, 333, 334.

In a VLIW-type microprocessor with a fixed instruction length, generally, the possibility that a NOP instruction appears in an instruction code is high. Accordingly, the first embodiment shows an example in which the specific instruction stored in the specific instruction storage unit 21 of the instruction analyzing section 2 is a NOP instruction.

The comparing unit 22 of the instruction analyzing section 2 compares each of four instructions included in an instruction for one cycle input into the instruction cache 1, with the instruction stored in the specific instruction storage unit 21 (i.e., a NOP instruction) to check whether the instruction is a NOP instruction or not. Then, the comparing unit 22 outputs analysis information indicating the comparison result for each instruction by 1 bit (for example, match is indicated by "1", and the unmatch is indicated by "0").

The analysis information is stored in the analysis information storing area 13 disposed in the tag storage unit 12.

The number of bits per cache line of the analysis information storing area 13 is determined by (the number of pipelines×the number of instructions stored in one cache line). In the embodiment, it is assumed that one line of the instruction cache 1 is 16 bytes=128 bits, and one instruction for one cycle is stored in one cache line. Accordingly, the number of bits for one cache line in the analysis information storing area 13 is four.

Figure 3:
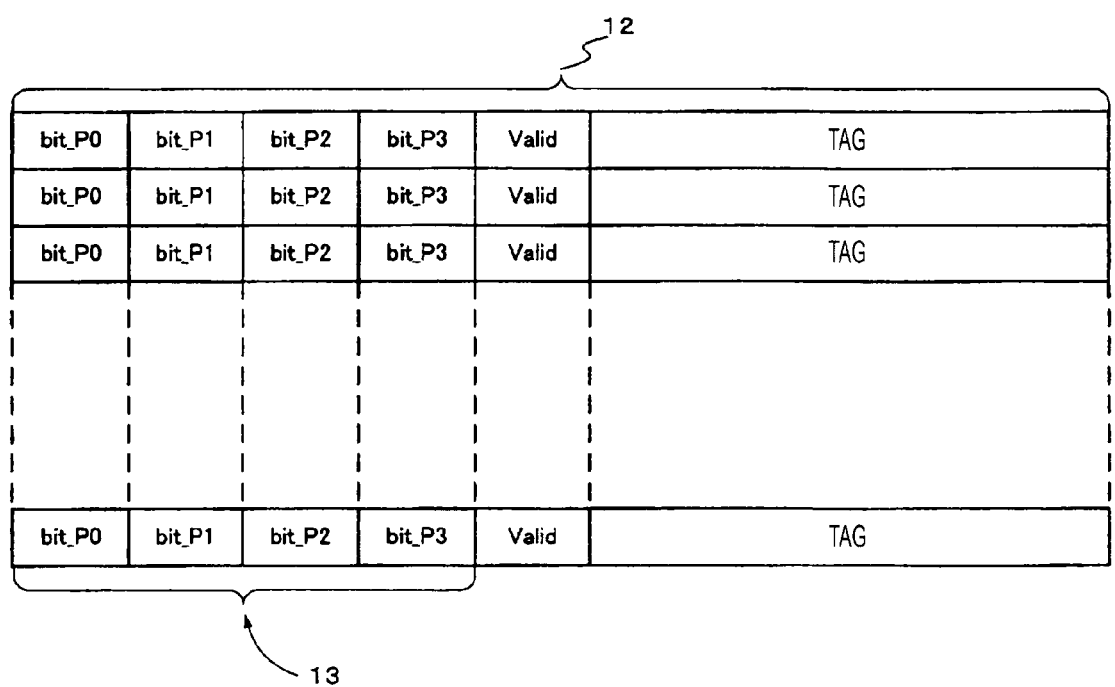
FIG. 3 is a diagram showing an example of a configuration of a tag storage unit of an instruction cache in the first embodiment.

FIG. 3 shows an example of the configuration of the tag storage unit 12 according to the first embodiment.

The information analysis information storing area 13 which stores 4-bit analysis information is disposed for each tag of the tag storage unit 12. In the figure, bit_P0, bit_P1, bit_P2, and bit_P3 indicate the analysis information for instructions input into the pipelines P0, P1, P2, P3, respectively.

When bit_P0 is "1", for example, the information indicates that the instruction input into the pipeline P0 is a NOP instruction.

Referring again to FIG. 2, when the instruction fetch unit 31 outputs a fetch request to fetch an instruction from the instruction cache 1, the specific instruction execute controller 34 of the processor core 3A reads out the analysis information for the instruction from the analysis information storing area 13, and analyzes whether the read-out analysis information indicates that the instruction is a NOP instruction, or not. As a result, when the analysis information indicates that the instruction is a NOP instruction, the specific instruction execute controller 34 controls an instruction decode unit for processing the instruction, so as not to perform the decoding operation.

In order to perform control by the specific instruction execute controller 34, the processor core 3A is provided with fetch stop units 351, 352, 353, 354 for stop fetching the instructions into the respective instruction decode units 321, 322, 323, 324 from the instruction fetch unit 31.

The specific instruction execute controller 34 outputs a stop signal to the fetch stop unit of a pipeline for processing the instruction in which the analysis information indicates that the instruction is a NOP instruction, thereby stopping the fetch of the instruction to the instruction decode unit of the pipeline (i.e., a NOP instruction).

As a result, the instruction decode unit need not decode a NOP instruction.

At this time, instead of the instruction decode unit which does not perform the decoding, selecting units 371, 372, 373, 374 are disposed in the processor core 3A in order to respectively input decoded values 361, 362, 363, 364 of NOP instructions to the instruction execute units 331, 332, 333, and 334.

The specific instruction execute controller 34 outputs a selection signal instructing selection of the decoded values 361, 362, 363, 364 of the NOP instructions in place of the outputs of the instruction decode units 321, 322, 323, 324, to the selecting units 371, 372, 373, 374 of the pipe lines for processing the instruction in which the analysis information indicates that the instruction is a NOP instruction.

Even when the NOP instructions are not decoded, therefore, the decoded values 361, 362, 363, 364 of the NOP instructions are input into the instruction execute units 331, 332, 333, 334.

According to the embodiment, when an instruction is fetched from the instruction cache, also analysis information related to the instruction is read out from the analysis information storing area of the instruction cache, and the read-out analysis information is analyzed whether the instruction is a NOP instruction or not. When, as the result of the analysis, the fetched instruction is a NOP instruction, it is possible to stop the fetch of the instruction into the instruction decode unit, and not to perform the decoding operation. Accordingly, the power consumption due to the decoding operation can be reduced, and the power consumption for executing the NOP instruction can be reduced.

Second Embodiment

Figure 4:
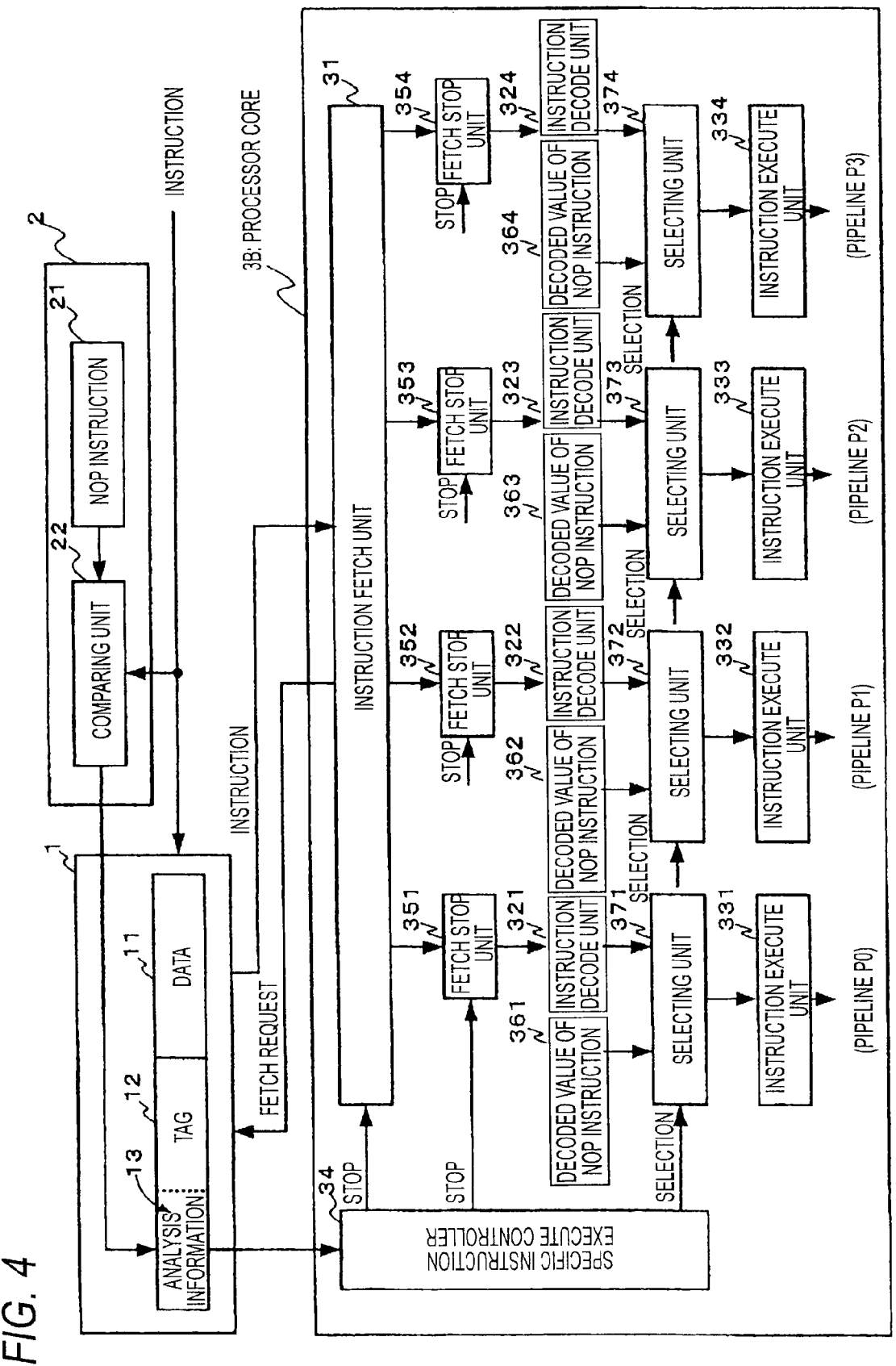
FIG. 4 is a block diagram showing an example of a configuration of a microprocessor according to a second embodiment of the present invention.

FIG. 4 is a block diagram showing an example of the configuration of a microprocessor according to a second embodiment of the present invention.

The microprocessor according to the second embodiment is a microprocessor in which the specific instruction stored in the specific instruction storage unit 21 of the instruction analyzing section 2 is a NOP instruction, similarly to first embodiment.

In the second embodiment, in addition to the functions of the microprocessor according to the first embodiment, when the instruction to be fetched from the instruction cache 1 is a NOP instruction, the read out of the NOP instruction data from the data storage unit 11 of the instruction cache 1 is stopped.

In order to perform the process described above, when the instruction fetch unit 31 outputs a fetch request, the specific instruction execute controller 34 of the processor core 3B of the embodiment first reads out analysis information from the analysis information storing area 13 of the instruction cache 1. When the analysis information indicates that the instruction to be fetched is a NOP instruction, the specific instruction execute controller 34 instructs the instruction fetch unit 31 to stop the reading of data corresponding to the NOP instruction from the data storage unit 11 of the instruction cache 1.

According to thus configured microprocessor, when an instruction is to be fetched from the instruction cache, the analysis information related to the instruction is read out in advance. When the read-out analysis information indicates that the instruction is a NOP instruction, the reading of the data from the instruction cache can be stopped. According to the configuration, the power consumption for the reading of data from the instruction cache can be reduced, and the power consumption for executing the NOP instruction can be further reduced.

Third Embodiment

Figure 5:
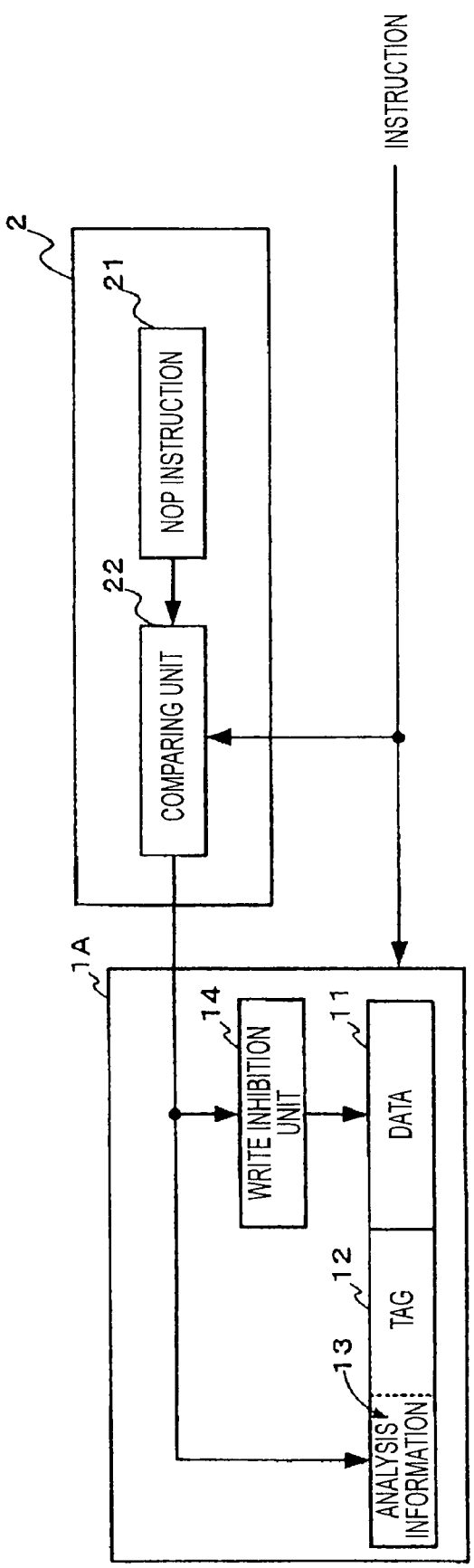
FIG. 5 is a block diagram showing an example of a configuration of an instruction cache in a microprocessor according to a third embodiment of the present invention.

In a microprocessor according to a third embodiment of the present invention, an instruction cache 1A shown in FIG. 5 is substituted for the instruction cache 1 in the first embodiment or the second embodiment. In the following description, therefore, only the instruction cache 1A will be described.

FIG. 5 is a block diagram showing an example of the configuration of the instruction cache 1A used in the microprocessor according to the third embodiment.

In the instruction cache 1A, a write inhibition unit 14 is disposed in addition to the instruction cache 1 shown in FIGS. 2 and 4.

When the analysis information output from the instruction analyzing section 2 indicates that the instruction input into the instruction cache 1A is a NOP instruction, the write inhibition unit 14 inhibits the writing of the input NOP instruction into the data storage unit 11.

According to the third embodiment, when a NOP instruction is included in the instruction input into the instruction cache, the writing of the NOP instruction into the data storage unit can be inhibited. Accordingly, the power consumption for the writing into the data storage unit of the instruction cache can be reduced, and the power consumption due to the existence of a NOP instruction can be further reduced.

Fourth Embodiment

Figure 6:
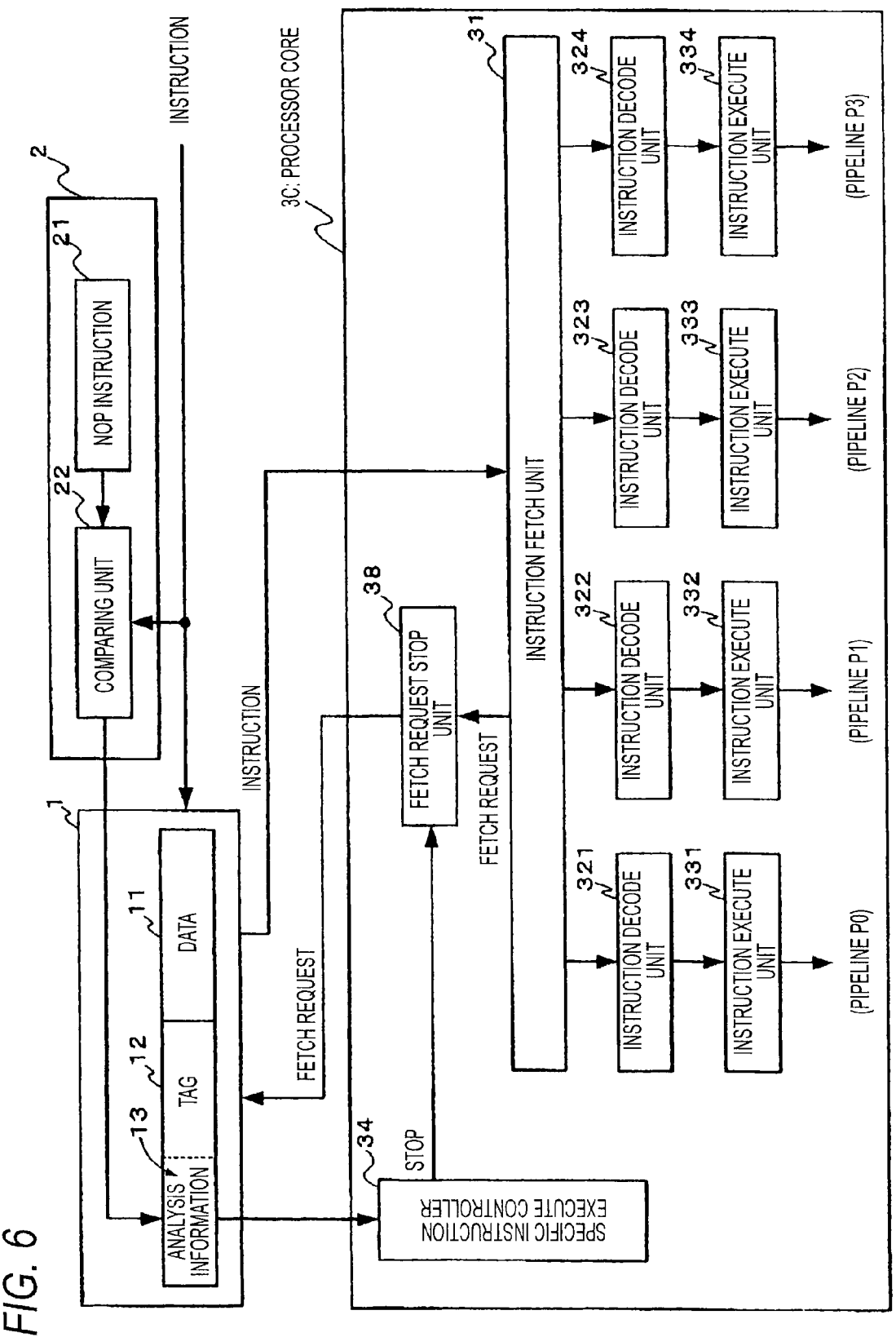
FIG. 6 is a block diagram showing an example of a configuration of a microprocessor according to a fourth embodiment of the present invention.

FIG. 6 is a block diagram showing an example of a configuration of a microprocessor according to a fourth embodiment of the present invention.

The fourth embodiment shows an example of a microprocessor in the case where a specific instruction stored in the specific instruction storage unit 21 of the instruction analyzing section 2 is an unconditional branch instruction.

The microprocessor of the embodiment is a VLIW-type microprocessor with a fixed instruction length, similarly to first embodiment. In a processor core 3C, four pipelines P0, P1, P2, P3 are disposed.

The processor core 3C includes the instruction fetch unit 31, and the instruction decode units 321, 322, 323, 324 and instruction execute units 331, 332, 333, 334 for the respective pipelines P0, P1, P2, P3. The processor core includes also the specific instruction execute controller 34.

When the instruction input into the instruction cache 1 includes an unconditional branch instruction, the instruction analyzing section 2 writes analysis information indicating the inclusion into an analysis information storing area 13 of the tag storage unit 12 of the instruction cache 1.

The number of bits per cache line of the analysis information storing area 13 is determined by (the number of pipelines which can be branch-processed×the number of instructions stored in one cache line).

In most of VLIW-type microprocessors, the number of pipelines which can be branch-processed is one in many cases. Also in the embodiment, the number of pipelines which can be branch-processed is one.

In the same manner as first embodiment, also in the fourth embodiment, one line of the instruction cache 1 has 16 bytes=128 bits, and an instruction for one cycle is stored in one cache line. Therefore, the number of bits per cache line in the analysis information storing area 13 is one.

Figure 7:
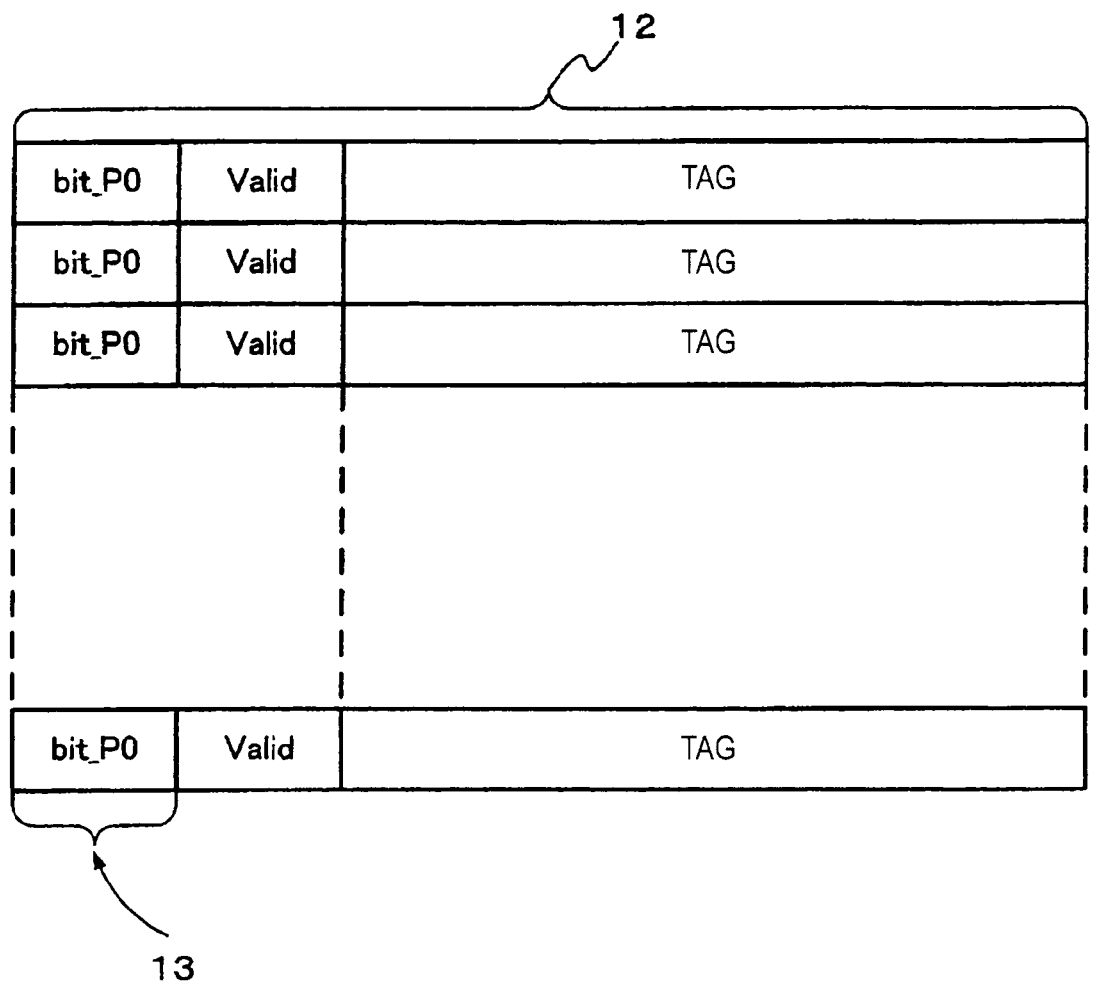
FIG. 7 is a diagram showing an example of a configuration of a tag storage unit of an instruction cache in the fourth embodiment.

FIG. 7 shows an example of a configuration of the tag storage unit 12 according to the fourth embodiment.

In the fourth embodiment, the analysis information storing area 13 which stores one bit of analysis information is disposed for each tag of the tag storage unit 12.

Referring again to FIG. 6, when the instruction fetch unit 31 outputs a fetch request to fetch an instruction from the instruction cache 1, the specific instruction execute controller 34 of the processor core 3C of the embodiment reads out the analysis information related to the instruction from the analysis information storing area 13, and analyzes whether the read-out analysis information indicates that the instruction is an unconditional branch instruction, or not. When, as a result of the analysis, the analysis information indicates that the instruction is an unconditional branch instruction, the specific instruction execute controller 34 controls the fetch operation so as not to perform the fetch of the next instruction.

In order to execute the control by the specific instruction execute controller 34, a fetch request stop unit 38 is disposed in the processor core 3C.

When the analysis information read out from the analysis information storing area 13 indicates that the instruction is an unconditional branch instruction, the specific instruction execute controller 34 outputs a stop signal to the fetch request stop unit 38, so as not to issue a fetch request for the next instruction output from the instruction fetch unit 31, to the instruction cache 1.

According to the fourth embodiment, when an instruction is fetched from the instruction cache, also analysis information related to the instruction is read out from the analysis information storing area of the instruction cache. When the read-out analysis information indicates that the instruction is an unconditional branch instruction, the instruction fetch of the next cycle can be stopped. Accordingly, excessive accesses to the instruction cache can be reduced. Therefore, the power consumption can be correspondingly reduced.

In the above-described embodiments, the description has been conducted by exemplifying the case where one specific instruction is stored in the specific instruction storage unit 21. Alternatively, plural specific instructions may be stored in the specific instruction storage unit 21. In the alternative, the analysis information related to the respective specific instructions is stored in the analysis information storing area 13, and the specific instruction execute controller 34 controls the operations of the instruction fetch unit 31 and the instruction decode unit 32 in accordance with the respective specific instructions.

In the above embodiments, it is described that an instruction cache 1 is used as a memory for temporary storing the instructions with the corresponding analysis information. However, any type of memory devices may be employed as the memory. For example, an instruction scratchpad memory may be employed in place of the instruction cache 1.

It is to be understood that the present invention is not limited to the specific embodiments described above and that the present invention can be embodied with the components modified without departing from the spirit and scope of the present invention. The present invention can be embodied in various forms according to appropriate combinations of the components disclosed in the embodiments described above. For example, some components may be deleted from the configurations as described as the embodiments. Further, the components in different embodiments may be used appropriately in combination.

What is claimed is:

1. A microprocessor comprising:
 a processor core that performs pipeline processing;
 an instruction analyzing section that analyzes an instruction to be processed by the processor core and outputs analysis information indicating whether the instruction matches with a specific instruction that is previously defined; and
 a memory having a tag storage unit that stores the analysis information and a data storage unit that temporarily stores the instruction in relation to the analysis information,
 wherein the processor core includes:
  an instruction fetch unit that fetches the instruction stored in the memory;
  an instruction decode unit that decodes the instruction fetched by the instruction fetch unit;
  an instruction execute unit that executes the instruction decoded by the instruction decode unit; and
  a specific instruction execute controller that reads out the analysis information stored in the memory and controls operation of at least one of the instruction fetch unit and the instruction decode unit when the analysis information indicates that the instruction matches with the specific instruction,
 wherein, when a no operation instruction, for which no processing is required, is defined as the specific instruction and the analysis information indicates that the instruction matches with the no operation instruction,
  the memory inhibits the instruction from being written into the data storage unit, and
  the specific instruction execute controller instructs the instruction decode unit to not perform a decoding operation.

2. The microprocessor according to claim 1,
wherein the specific instruction execute controller reads out the analysis information from the memory before the instruction fetch unit performs a fetch operation on the instruction, and
wherein the specific instruction execute controller controls the instruction fetch unit to stop performing the fetch operation on the instruction when the analysis information indicates that the instruction matches with the no operation instruction.

3. The microprocessor according to claim 1,
wherein a branch instruction is defined as the specific instruction, and
wherein the specific instruction execute controller controls the instruction fetch unit to stop performing a fetch operation in a next processor cycle when the analysis information indicates that the instruction matches with the branch instruction.

* * * * *